United States Patent [19]

Richmond

[11] Patent Number: 5,545,318

[45] Date of Patent: Aug. 13, 1996

[54] CLOG RESISTANT WATER VALVE INLET SCREEN WITH RIBS

[75] Inventor: James W. Richmond, Carmel, Ind.

[73] Assignee: Emerson Electric Co., St. Louis, Mo.

[21] Appl. No.: 332,679

[22] Filed: Nov. 1, 1994

[51] Int. Cl.$^6$ .................................................. B01D 35/02
[52] U.S. Cl. .............................. 210/232; 137/1; 137/544; 210/407; 210/456; 210/497.01
[58] Field of Search ..................................... 210/232, 435, 210/437, 446, 456, 497.01, 497.3, 407; 251/30.03, 120; 137/1, 544–546; 55/418, 419

[56] References Cited

U.S. PATENT DOCUMENTS

| | | | |
|---|---|---|---|
| 840,388 | 1/1907 | Simms | 210/435 |
| 851,830 | 4/1907 | Park | 251/544 |
| 3,363,763 | 1/1968 | Erickson | 210/446 |
| 4,052,315 | 10/1977 | Lindsay | 210/232 |
| 4,406,326 | 9/1983 | Wagner | 166/227 |
| 4,882,055 | 11/1989 | Stamstad | 210/483 |
| 5,082,240 | 1/1992 | Richmond . | |
| 5,090,441 | 2/1992 | Richmond . | |
| 5,269,333 | 7/1993 | Richmond | 137/1 |

*Primary Examiner*—Joseph W. Drodge
*Attorney, Agent, or Firm*—Eric R. Waldkoetter

[57] ABSTRACT

A water valve inlet screen has a mesh network for filtering contaminates, and openings to allow water to pass through the inlet screen and into the valving cavity. Ribs of differing heights are formed on the mesh network to hold large particles away from the openings and allow water to flow around the particles. Additionally, the ribs increase the turbulence of water flow and, thus, reduce the stability of contaminates lodged on the ribs and encourage them away from the openings that they rest in front of. A flange is located on the downstream end of the inlet screen with serrations to provide openings for allowing water passage through the flange. Water passing through the flange encourages large particles to accumulate at the downstream end of the inlet screen, and leaves the upstream end of the inlet screen with fewer obstructions to block the free flow of water.

25 Claims, 10 Drawing Sheets

PRIOR ART METAL MESH SCREEN
——— MALLORY CLOG-RESISTANT INLET SCREEN

CLOG RESISTANT WATER VALVE INLET SCREEN WITH RIBS

BACKGROUND

This invention relates to liquid purification in water valves involving a screening device inserted into the open end of a pipe or inlet channel. The screening device is positioned such that water flowing through the valve inlet channel must pass through the screen to prevent particles in the water larger than the screen openings from passing through the channel along with the water.

Contamination, especially in the form of particulate matter, can impair the operation of water valves. Contamination can take many forms including sand particles, mineral particles, organic particles, mineral deposits, or other impurities. The basic structure of a pilot actuated water valve provides many opportunities for contamination to impair valve operation. There are small passages through which water must pass such as a bleed passage and a pilot passage. There are also close fitting parts that must move or seal such as the fitting between the pilot valve outlet extension and the outlet, and the seal between the diaphragm and valving surface.

A water valve impairment can also take many forms including the following: a complete bleed passage obstruction causing catastrophic valve failure; a partial bleed passage obstruction slowing valve closing thereby wasting water; an obstruction between the outlet and the pilot valve outlet extension causing valve failure; a partial obstruction between the outlet and the pilot valve outlet extension causing slowed or incomplete valve closing; an obstruction between a guide tube and armature that causes valve failure; or a partial obstruction between the guide tube and armature that interferes with pilot valve operation.

An impaired water valve often increases water consumption through incomplete or slow closing. When an inlet water valve used in a household appliance is impaired but still functional, it may be difficult for the appliance operator to recognize the impairment because the water valve will leak to a holding tank or to a drain which may not be visible to the appliance operator. If the water valve is impaired by closing more slowly than designed, then water levels may be higher than desired or water volume may be greater than desired or the water valve may direct some water directly into an open drain. Unnecessary water consumption is not desirable, particularly when the water wasted is hot water. Wasting of even small amounts of hot water increases energy consumption.

Because of the destructive effects that contaminate particles may have on a water valve, a screening device is placed at the inlet to the water valve. The presence of an inlet screen prevents contaminate particles larger than a specified diameter from entering into the main valve, thus reducing the chance of valve failure as the result of an obstruction from a contaminate particle. Some prior art water valve inlet screens 22P, such as shown in FIG. 1, have been manufactured from a woven wire cloth 56P, such as that produced by Newark Wire Cloth Co., Newark, N.J., of forty (40) mesh, i.e., mesh with width of openings of 0.016 inches (0.041 cm) to produce an open area percentage of 41%, and made with 0.009 inch (0.022 cm) diameter wire. However, as contaminate particles collect on the screen, the screen openings 57P become blocked by large particles resting on the screen or lodged in the screen openings 57P. When enough of the screen openings become blocked, the free flow of water into the valve is impaired and valve failure results. An example of a water valve with a wire inlet screen is disclosed in U.S. Pat. No. 5,269,333 issued to Richmond.

For the foregoing reasons, there is a need to reduce clogging in the water valve inlet filter to reduce the probability of substantial blockage of the filter causing the valve to fail.

SUMMARY

I have invented a screening device that satisfies the need to reduce clogging in the water valve inlet filter which is caused by contaminates that come in contact with the filter. It is an objective of the invention to reduce the probability of total valve failure because of substantial blockage of the inlet filter.

A further objective of the invention is to provide a low cost inlet screen that will be strong enough to withstand high water pressures, and durable enough to withstand the chemical additives in many modern water systems.

A clog resistant water valve contains an inlet channel, a valving cavity, and an inlet screen. The inlet screen is placed in the inlet channel such that it has an upstream end, a downstream end and sidewalls. The inlet screen comprises a mesh network with openings on the upstream end and side walls. Ribs of differing heights are formed on the mesh network. The ribs serve to hold large contaminate particles away from the mesh openings and to increase the turbulence of water flow over the ribs, thus, reducing the stability of contaminates and urging them away from the mesh openings. Furthermore, a serrated flange extends from the downstream end of the inlet screen. The serrated flange has flange passages to permit communication of water from the inlet channel into the valving cavity. Water flowing through the flange passages creates a low pressure area around the serrated flange causing more water to flow towards the downstream end, and urging contaminates on the mesh network towards the serrated flange. The invention is composed of a glass filled polypropylene material. The glass serves to add strength to the inlet screen and the polypropylene allows the screen to withstand the chemical additives in many modern water systems.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 2:
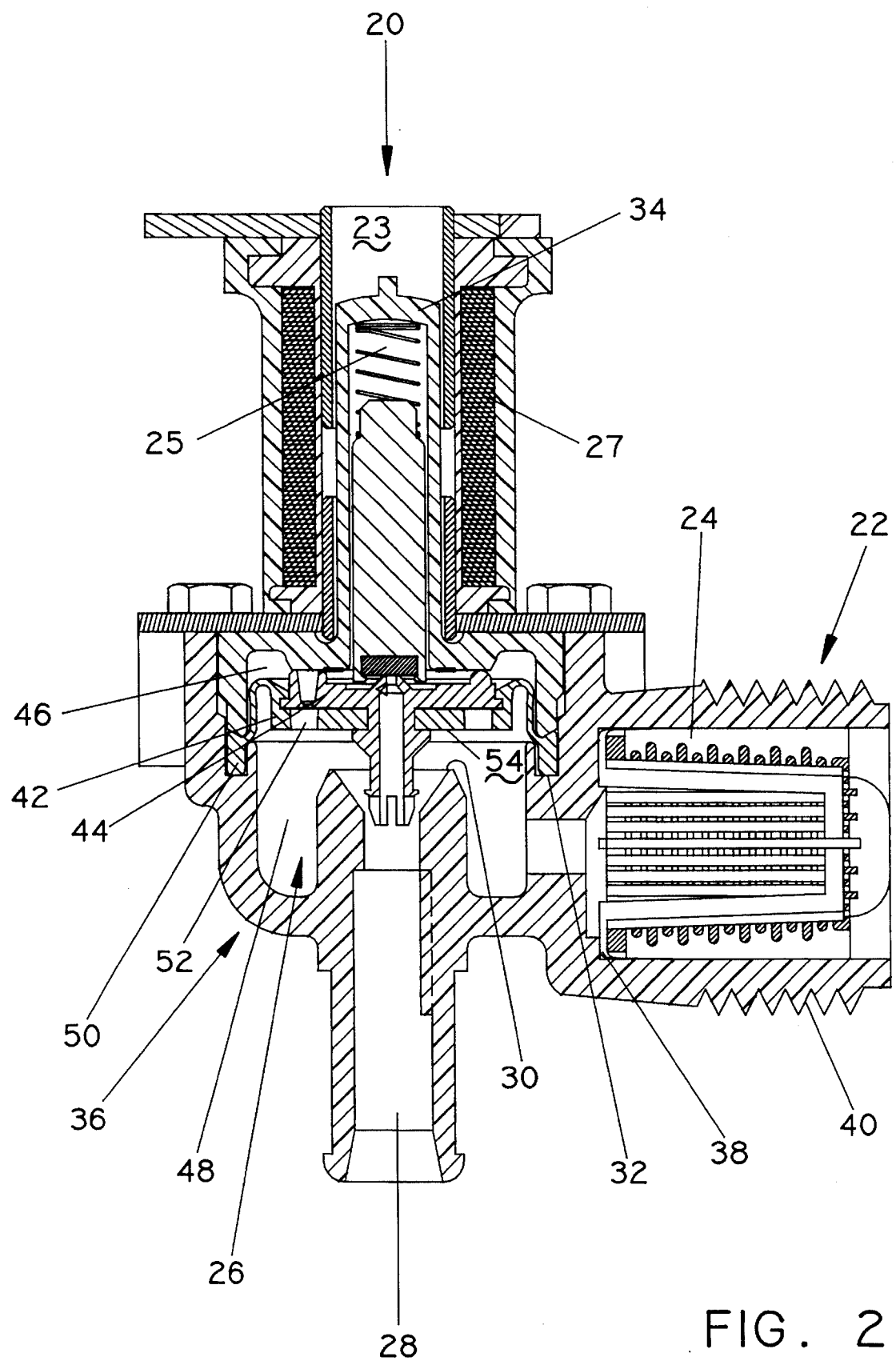
FIG. 2 shows a sectioned view of a clog resistant water valve inlet screen positioned in a water valve.

Referring to FIG. 2, a clog resistant water valve 20 comprises an inlet screen 22, an inlet channel 24 for receiving water from a water source pipe (not shown), and a valving cavity 26 for controlling water flow into an appliance such as a dishwasher or a clothes washing machine. The water valve 20 further comprises a solenoid armature 23, a biasing spring 25, field windings 27, an outlet 28, a valving surface 30, a diaphragm retention groove 32, a guide tube 34, and a main valve 36.

The inlet channel 24 is typically cylindrical in shape with a diameter of about 0.75 inches (1.91 cm) and houses the inlet screen 22. The inlet channel 24 comprises an inlet channel base 38, a connector 40, and may also contain a flow control and noise suppressor to the downstream of the inlet screen (not shown). The inlet channel base 38 is a small lip located on the inlet channel 24 to properly position the inlet screen 22 in the inlet channel 24. The connector 40 is typically a threaded garden hose type connector or a threaded pipe connector (not shown).

A water source pipe such as a residential water line with service pressures ranging from 20–125 pounds per square inch (138–861.9 kPa) is connected to the inlet channel 24 to create flow rates through the water valve 20 of about one (1) to about twenty (20) gallons (3.79–75.71 liters) per minute. The outlet 28 is typically a tube connector to which an appliance fill tube (not shown) is clamped.

The valving cavity 26 is disposed between and communicates with the inlet channel 24 and the outlet 28. The valving surface 30 is contained in the valving cavity 26 adjacent to the outlet 28. The valving cavity 26 also contains a retention groove 32 for fixing the main valve 36. The guide tube 34 is designed to cooperate with the retention groove 32 for fixing the main valve 36 in position.

Figure 1:
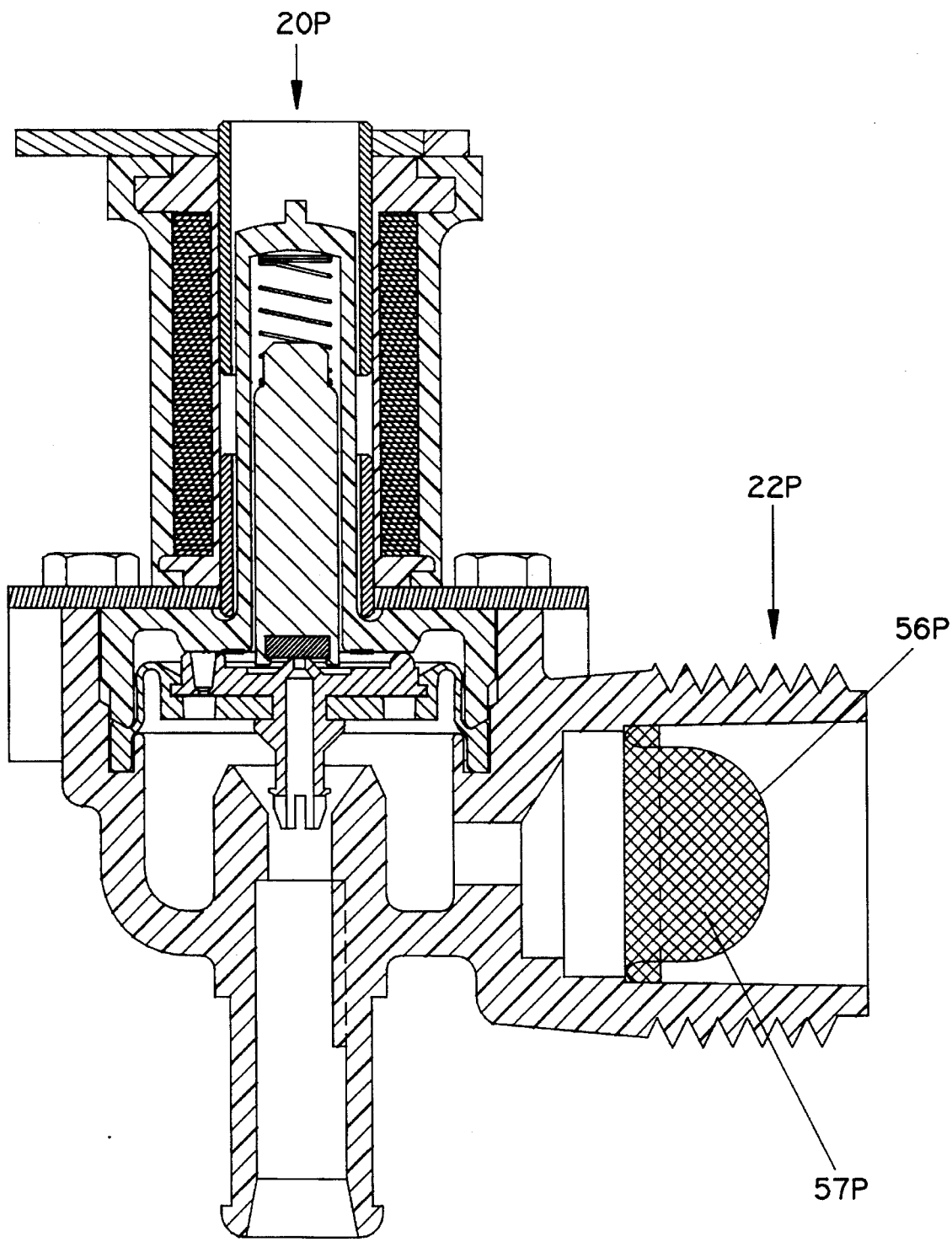
FIG. 1 shows a sectioned view of a prior art standard metal mesh screen positioned in a water valve.

The main valve 36 comprises a diaphragm 42 and a diaphragm insert 44. The main valve 36 divides the valving cavity into an actuation chamber 46 and a main chamber 48. The main valve 36 is moveable to an open position away from the valving surface 30 for permitting water flow from the inlet 24 through the valving cavity 26 to the outlet 28, and moveable to a closed position contacting the valving surface 30 for preventing water flow from the inlet 24 through the valving cavity 26. The diaphragm 42 is flexible and is typically made of ethylene propylene (EP) rubber and includes a retention ridge 50, diaphragm bleed orifice 52, and a diaphragm valve seat 54. The retention ridge 50 fits in the diaphragm retention groove 32 and the guide tube 34 sets on the retention ridge 50 to fix the diaphragm 42 in the water valve 20 and to create a seal. An example of a water valve with the above characteristics and a metal mesh inlet screen, 74P (FIG. 1), is disclosed in U.S. Pat. No. 5,269,333 incorporated herein by reference.

Figure 3:
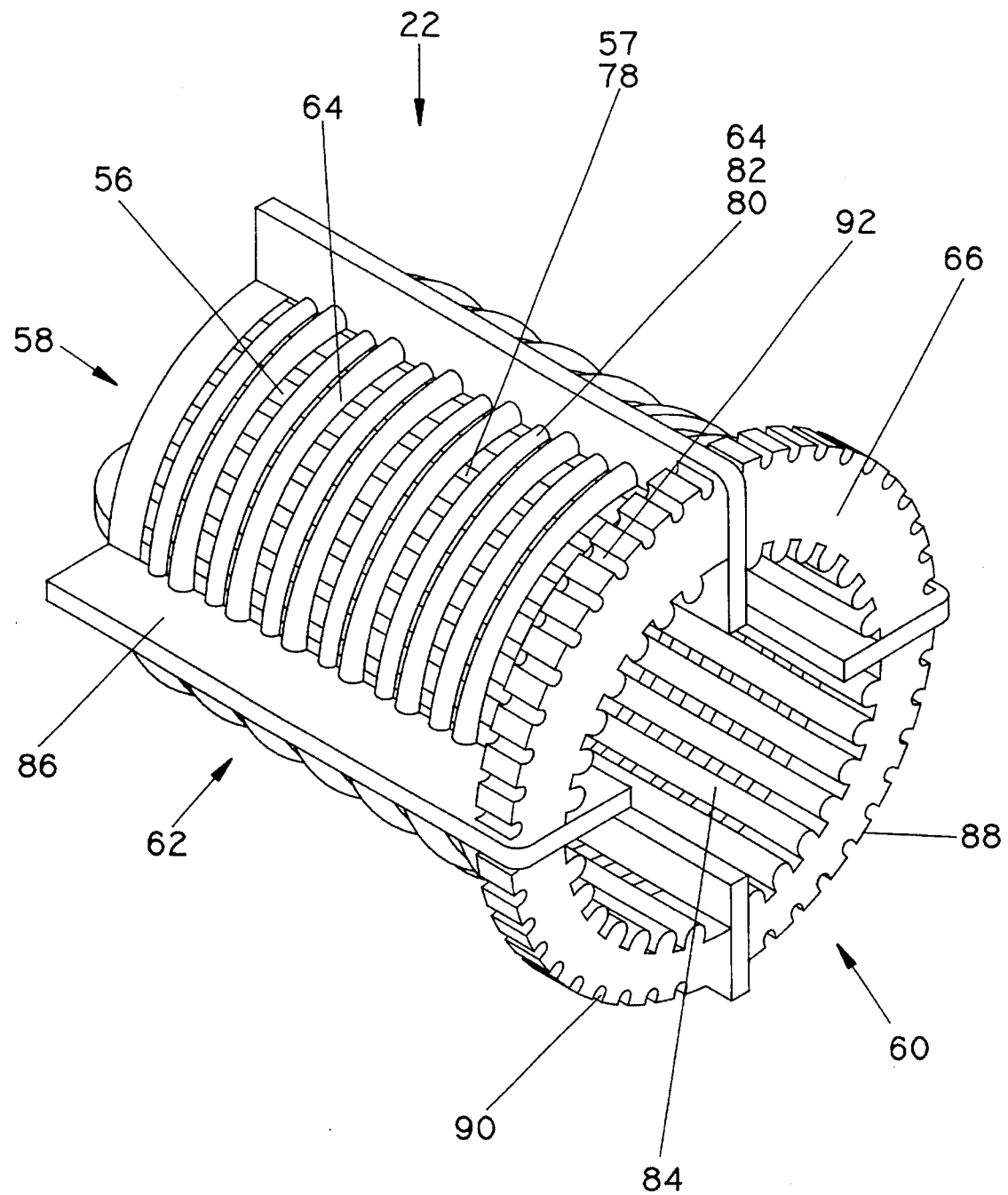
FIG. 3 shows a downstream isometric view of the inlet screen.
Figure 4:
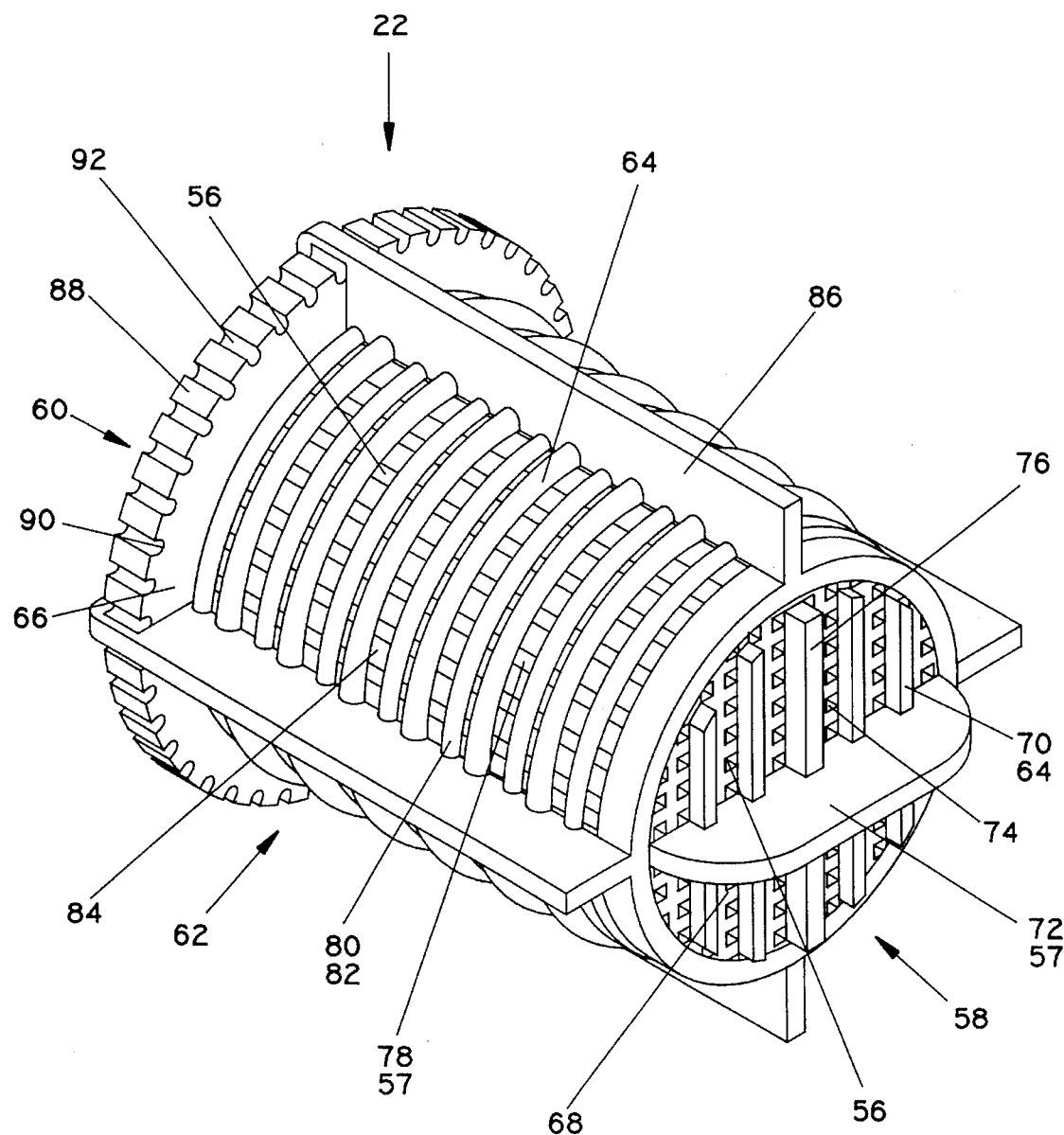
FIG. 4 shows an upstream isometric view of the inlet screen.
Figure 5A:
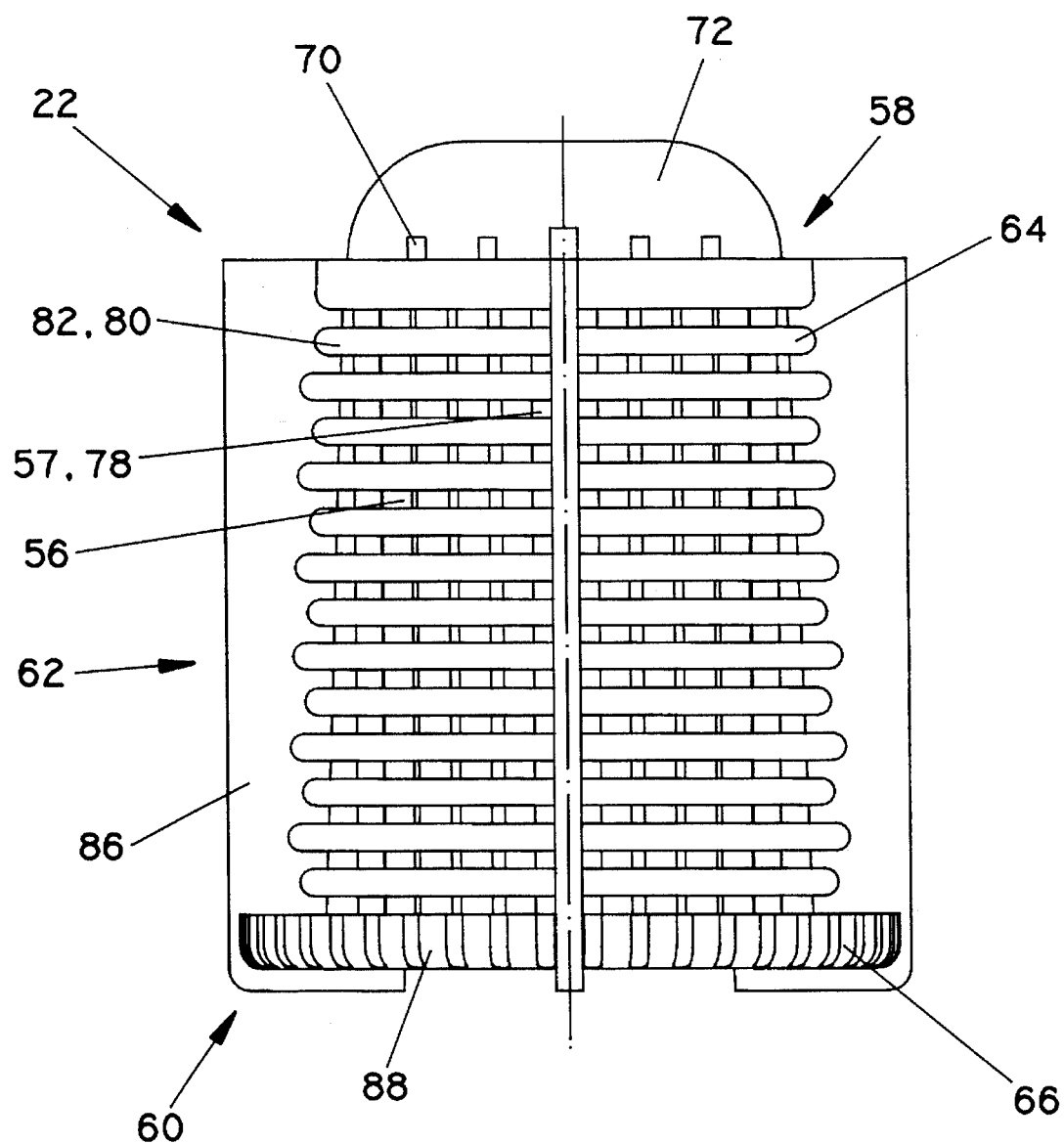
FIG. 5a shows a view of the inlet screen from the upstream end.
Figure 5B:
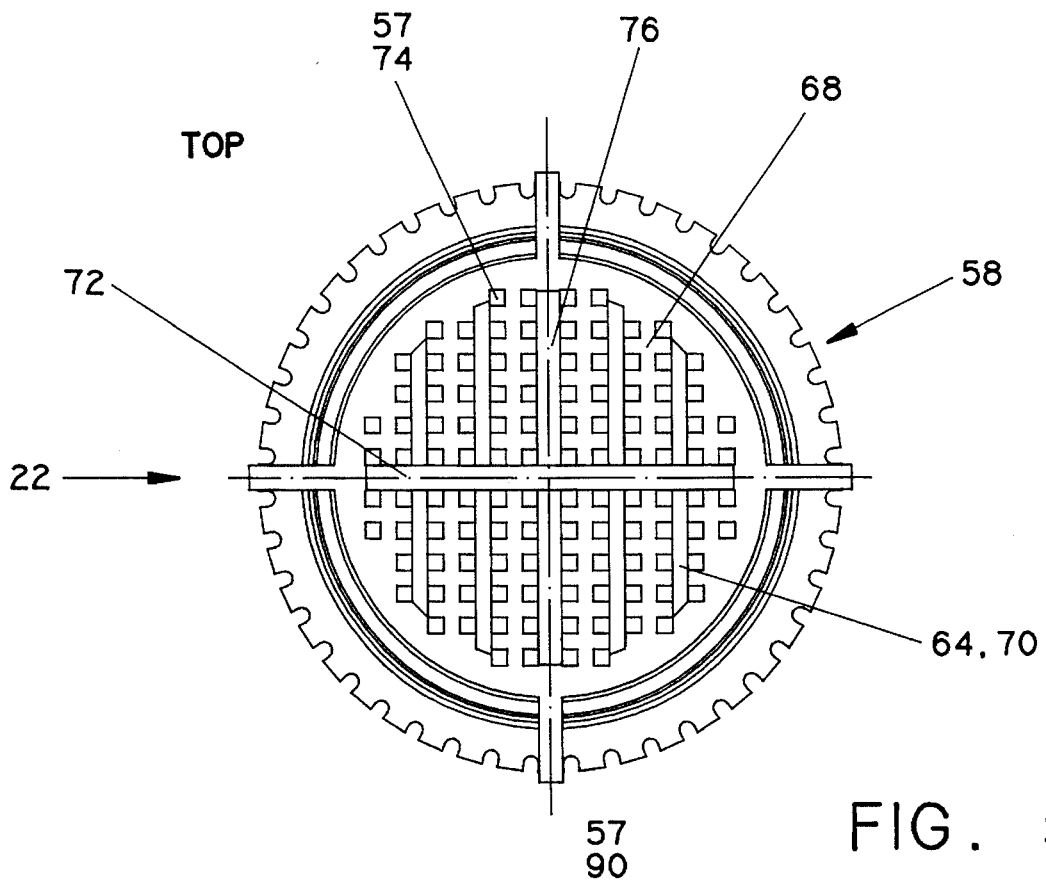
FIG. 5b shows a side view of the inlet screen with an annular rib design.
Figure 5C:
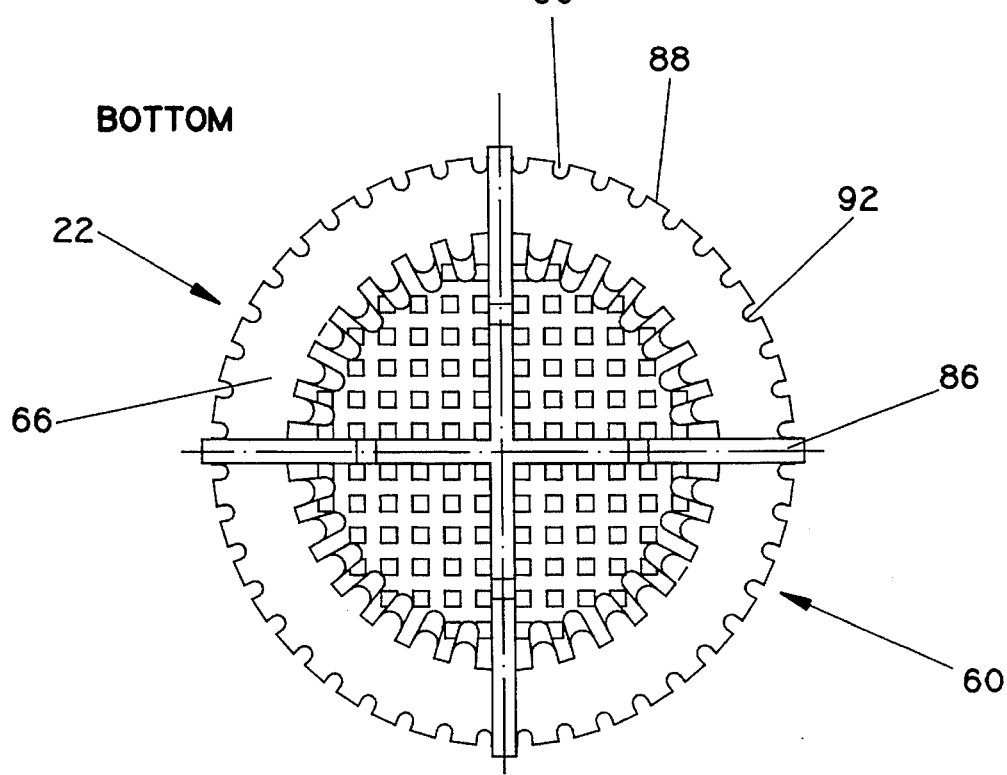
FIG. 5c shows a view of the inlet screen from the downstream end.
Figure 6:
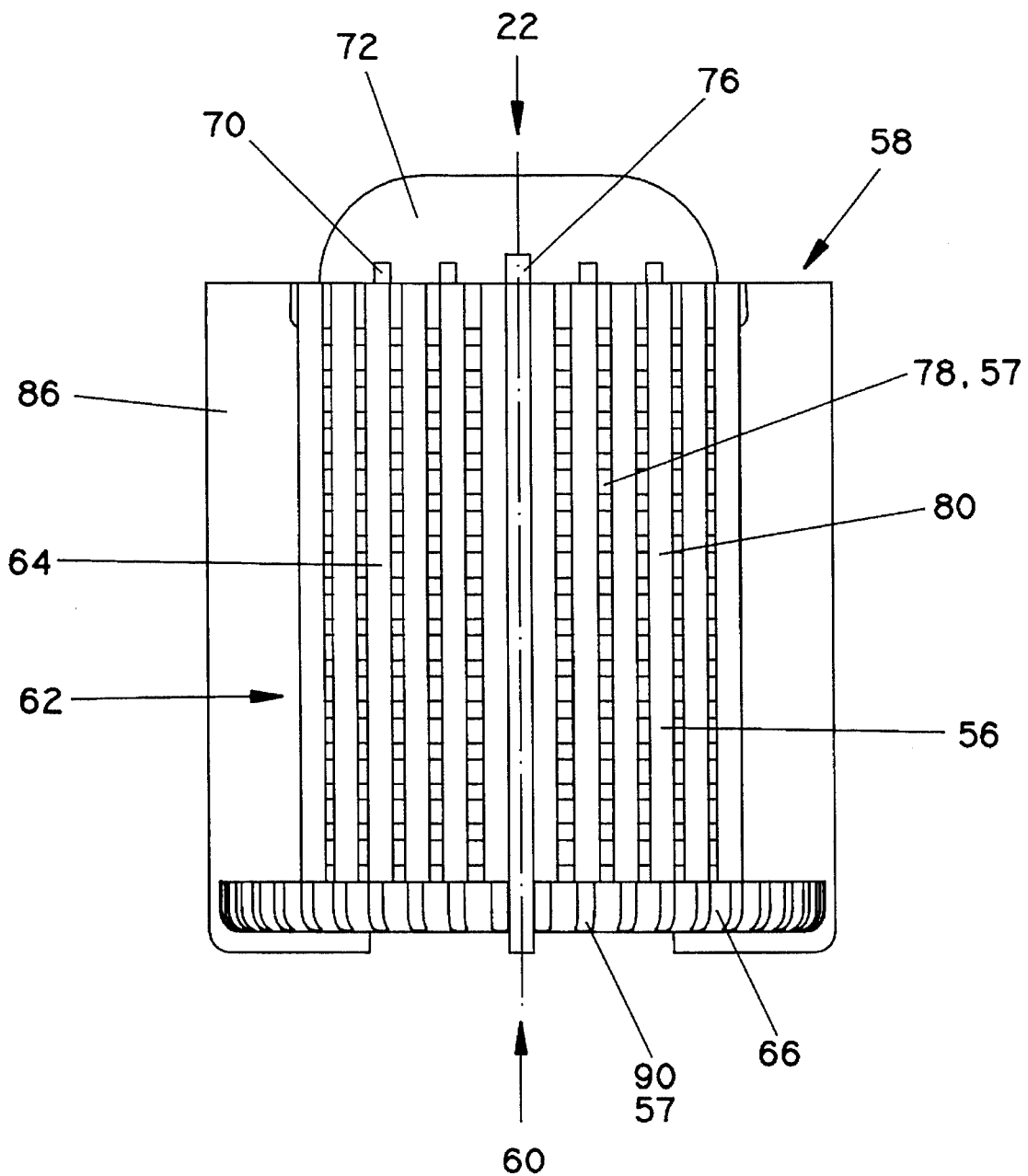
FIG. 6 shows a side view of the inlet screen with an alternative axial rib design.

Referring to FIGS. 3, 4 and 5, the inlet screen 22 comprises a mesh network 56 with screen passages (or openings) 57, an upstream end 58, a downstream end 60, side walls 62, ribs 64, and a serrated flange 66. The inlet screen 22 is placed in the inlet channel 24 such that the upstream end 58 receives water before the downstream end 60. The inlet screen 22 is typically cup shaped and manufactured from a glass filled polypropylene material. The cup shaped design of the screen is an effort to provide maximum surface area on the screen, thus allowing for a maximum number of screen openings to facilitate water communication into the valving cavity 26. The polypropylene in the inlet screen gives it the ability to withstand the chlorine and chloramine additives in many water systems. Mixing glass in with the polypropylene provides additional structural strength for the screen needed to withstand high water pressures.

The upstream end 58 of the inlet screen 22 includes a face screen 68, face ribs 70, and a removal tab 72. The face screen 68 is a part of the mesh network 56 of the inlet screen 22. Face openings 74 are formed on the face screen 68 for communication of water from the inlet channel 24 to the valving cavity 26. The face openings 74 formed are quadrilateral in shape with a surface area of approximately 0.0004 square inches (0.0026 square centimeters), and are for communication of water through the inlet screen 22. The described sizes of the screen passages in this specification are for use in laundry valve applications. When the clog resistant water valve inlet screen is used in other applications, such as dishwasher valves, the sizes of the screen passages may be slightly smaller.

Extending from the face screen 68 are the face ribs 70. The face ribs 70 are parallel to each other and situated such that there are two face openings 74 distancing every face rib 70. Every face rib 70 (with the exception of a center face rib 76) is extended 0.025 inches (0.064 cm) beyond the outside of the face screen 68 to hold large incoming contaminate particles away from the face openings 74. Two face openings are left between each face rib 70 (as opposed to one face opening 74 between each face rib 70) to allow for ease of tooling and for maximum fluid flow through the screen 22. The center face rib 76 also extends 0.010 inches (0.25 cm) above the other ribs 70. Additionally, the center face rib 76 extends to the inside of the face screen 68 0.060 inches (0.152 cm). This extension provides additional structural support for the inlet screen 22.

Another extension from the face screen 68 is the removal tab 72. The removal tab 72 is situated perpendicular to the face ribs 70, and cuts through the middle of each face rib 70. The removal tab 72 is extended 0.130 inches (0.330 cm) beyond the face screen 68. The inlet screen 22 is designed to be removed from the inlet channel 24 by means of needle nosed pliers (or similar instrument) and the removal tab 72. The removal tab 72 becomes visibly marked upon removal of the inlet screen 22 from the inlet channel 24. This happens because the needle nosed pliers scar the removal tab 72 with cuts and scratches in the process of removal. This feature is desirable because it indicates whether the inlet screen has been removed at any previous time. Furthermore, the removal tab 72 extends 0.060 inches (0.152 cm) to the inside of the face screen 68. Such an extension provides additional structural support for the inlet screen 22.

The sidewalls 62 of the inlet screen 22 are formed from the mesh network 56 and include side passages 78 and sidewall ribs 80. The side passages 78 formed are quadrilateral in shape with a surface area of approximately 0.0004 square inches (0.0026 square centimeters), and are for communication of water through the inlet screen 22.

The sidewall ribs 80 are annular ribs 82 oriented substantially perpendicular to the direction of water flow, and extending outwardly from the mesh network with no two adjacent ribs of the same height. The ribs 80 are of differing heights such that every other annular rib extends 0.015 inches (0.038 cm) beyond the rib 80 on either side. The positioning of the sidewall ribs 80 extending to the outside of the mesh network 56 serves several functions. One function of the sidewall ribs 80 is to hold large particles away from the side passages 78, thus allowing increased flow of water around any large particles trapped on any two annular ribs 82. Another function is that the added rib height of every other annular rib 82 provides a substantial increase in the strength of the inlet screen 22. Furthermore, the alternating height of the annular ribs 82 increases the turbulence of the water flow over the ribs 82 and reduces the stability of contaminates. Another feature of the annular ribs 82 is that they are radiused to reduce the stability of contaminates that come into contact with the ribs 82 and encourage the large particles held away from the side passages 78 to more easily slide toward the downstream end 60 of the inlet screen 22. Prior art screening devices have not displayed these features. An example of a prior art fluid filter is disclosed in U.S. Pat. No. 4,052,315 issued to Lindsay, which contains neither ribs of alternating height nor annular ribs that are radiused.

Axial ribs 84 are situated to the inside of the sidewalls 62 and extend from the upstream end 58 to the downstream end 60 of the inlet screen 22. The upstream diameter of the sidewalls 62 is of smaller diameter than the downstream diameter, and, thus, the sidewalls 62 are tapered from the downstream end 60 to the upstream end 58.

Installation tabs 86 are provided on the inlet screen 22 from an extension of the sidewalls 62 at the same location as four of the axial ribs 84. Forming the installation tabs 86 on top of the axial ribs 84 provides a substantial increase in the strength of the inlet screen 22 by virtue of the added rib height. The four axial ribs 84 forming the installation tabs 86 extend to the outside of the side walls 62 to the extent that each installation tab 86 fits snugly against the inlet channel 24 for the length of the tab 86. For ease of installation, the installation tabs 86 are slightly tapered from the upstream end 58 to the downstream end 60. On the upstream end 58, 0.765 inches (1.94 cm) separates the opposing edges of the installation tabs 86. On the downstream end 60, 0.740 inches (1.88 cm) separates opposing edges of the installation tabs 86. This tapering of the installation tabs allows the downstream end 60 of the inlet screen 22 to slide easily into the inlet channel 24. As the inlet screen 22 is forced further into the inlet channel 24, the tapered installation tabs 86 form a snug fit for the inlet screen in the inlet channel 24.

The four installation tabs 86 also reach into the inside of the side walls 62 0.060 inches (0.152 cm) past the other axial ribs 84. Additionally, each of the installation tabs 86 are spaced at 90 degree intervals. Two of the installation tabs 86 are aligned with the removal tab 72 on the face screen 68. The other two installation tabs 86 are perpendicular to the removal tab 72 and aligned with the center face rib 76. The installation tabs 86 join with the extensions of the center face rib 76 and the removal tab 72 on the inside of the face screen 68. This configuration substantially increases the structural strength of the inlet screen.

The downstream end 60 of the inlet screen 22 includes a serrated flange 66 with a flange circumference 88 and flange passages 90. When the inlet screen 22 is properly positioned in the inlet channel 24 the circumference 80 of the serrated flange 66 will contact the inlet channel 24 and flange passages 90 will be formed. Notches 92 in the serrated flange 66 are such that the flange passages 90 formed are semi-circle shaped with a surface area of approximately 0.00035 square inches (0.0023 square centimeters). The flange passages 90 allow for increased fluid flow through the inlet screen 22 by providing additional passages at the downstream end 60 of the screen 24. This flow of fluid through flange passages 90 allows for a low pressure area at the downstream end 60 of the inlet screen 22, and, therefore, more water will flow toward the flange 66. As this additional water flows toward the flange 66, large particles held away from the side passages 78 by the annular ribs 82 will be encouraged to migrate toward the flange 66. This feature causes particles to accumulate at the flange 66 before causing clogs in other parts of the inlet screen 22.

Each installation tab 86 extends 0.025 inches (0.064 cm) past the flange 66 on the downstream end 60 of the inlet screen 22. This extension past the flange 66 on each installation tab 86 properly positions the inlet screen 22 against the inlet channel base 38. The positioning of the inlet screen 22 is such that the serrated flange 66 is distanced from the inlet channel base 38 by the installation tabs 86, allowing for water communication through the flange passages 90 and around the inlet channel base 38. Absent this spacing, the flange passages 90 would be blocked because the flange passages 90 would rest against the inlet channel base 38.

OPERATION

Figure 7:
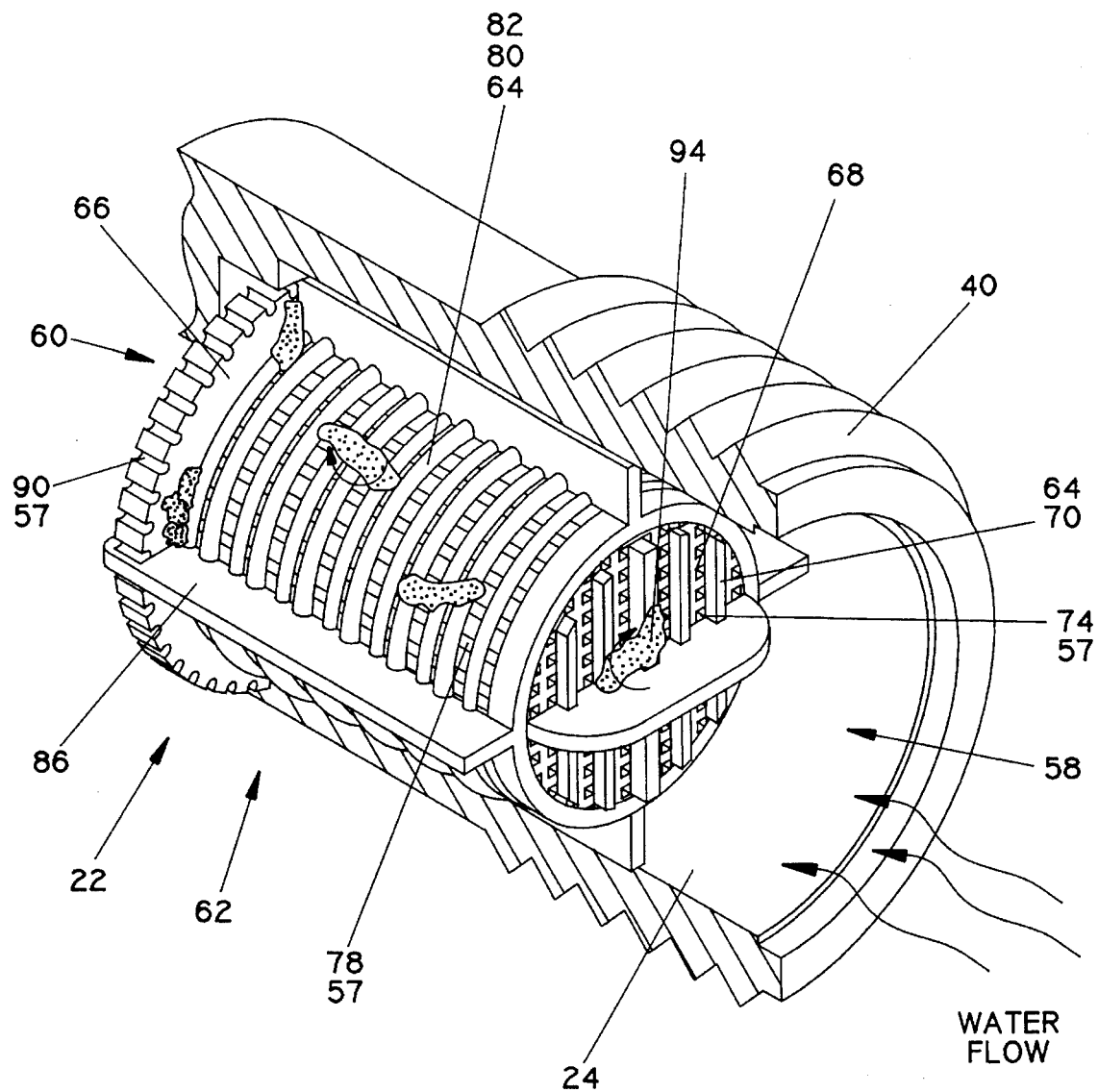
FIG. 7 shows an isometric view of the inlet screen in the inlet channel as it filters contaminate particles.
Figure 8:
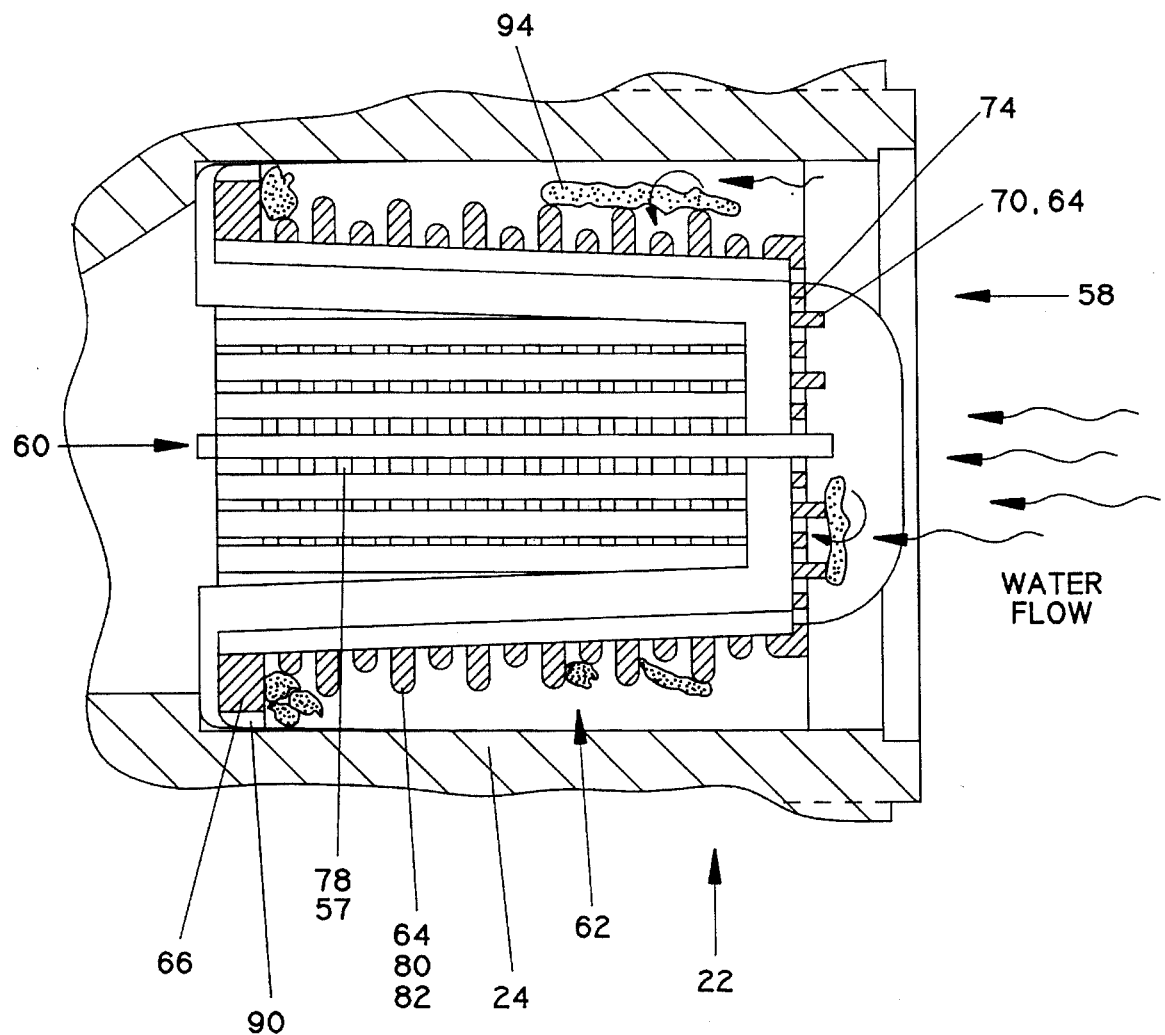
FIG. 8 shows a side view of the inlet screen in the inlet channel with large particles held away from the mesh openings by the ribs.

FIGS. 7 and 8 show the operation of the clog resistant water valve inlet screen. When the water valve 20 is open, fluid rushes into the inlet channel 24 and passes through the inlet screen passages 57. The flow of fluid through the inlet channel 24 will often bring contaminate particles 94. When a contaminate particle 94 reaches the inlet screen 22, it will either travel through one of the passages 57 or it will be captured by the screen 22. Particles 94 detained by the screen 22 may fall in one of the following categories: (1) those particles 94 lodged in, or on, one of the screen passages 57, partially or totally blocking a passage 78, (2) those particles 94 held away from the face passages 68 by the face ribs 70, or (3) those held away from the side passages 78 by the annular ribs 82.

Particles 94 that become lodged on top of or inside of a passage 78 are of concern to the operation of an inlet screen 22 because this problem is what will eventually cause total screen blockage and valve failure. The clog resistant water valve inlet screen combats this problem in several ways. One way that the clog resistant water valve inlet screen tackles this problem is that the ribs 64 of the screen hold large particles away from the screen passages 57, allowing water to flow around the particles, and therefore fewer screen passages 57 are blocked over time. Furthermore, the clog resistant water valve inlet screen has an elongated cup shape, resulting in more surface area than many prior art inlet screens. The increased surface area of the screen 22 allows for more surface area in screen passages 57, and, thus, larger contaminate particles are allowed to travel through the passages 57 rather than clogging the passages 57. Since these particles do not become lodged in the passages 57 of the screen, the chances of total screen blockage are reduced. However, the passing of these larger particles may be dangerous to the water valve by causing blockage of bleed passages, improper sealing, and other problems. Nevertheless, when the screen is used in conjunction with a fluid valve that has anti-clog features, such as U.S. Pat. No. 5,269,333 issued to Richmond, the passage of the larger particles will not have a detrimental effect on the operation of the fluid valve.

Particles 94 held away from the side passages 78 by the annular ribs should not prevent water from passing through the opening which the particle 94 is being held away from. When a particle 94 is held away from a side passage 78 in this manner, incoming fluid can flow around the particle 94 and through a passage because the contaminate particle is not actually clogging a passage 78, rather it is held out in front of a passage 78. The stability of a particle 90 held by the annular ribs is decreased by the increased turbulence of water flowing over the sidewall ribs 80 of differing heights. In conjunction with this, the flow of water through the flange passages 90 will encourage particles 94 held by the annular ribs 82 to migrate toward the flange 66. This action results in an accumulation of particles 94 at the downstream end 60 of the inlet screen 22, leaving the upstream end 58 free and clear for screening future contaminates.

Just as particles held by the annular ribs 82, particles held away from the face passages 74 by the face ribs 70 will not clog the inlet screen 22. When a particle 94 is in this position, incoming fluid can flow around the particle and through the face passage 74 because the contaminate particle 94 is not clogging a passage 74. Additionally, the flow of water along the sidewalls 62 and the increased turbulence of water from the rib 70 structure will reduce the stability of particles lodged on the face ribs 70 and encourage them to migrate toward the flange 66. This action assists in leaving the upstream end 58 free and clear for screening future contaminates.

Figure 9:
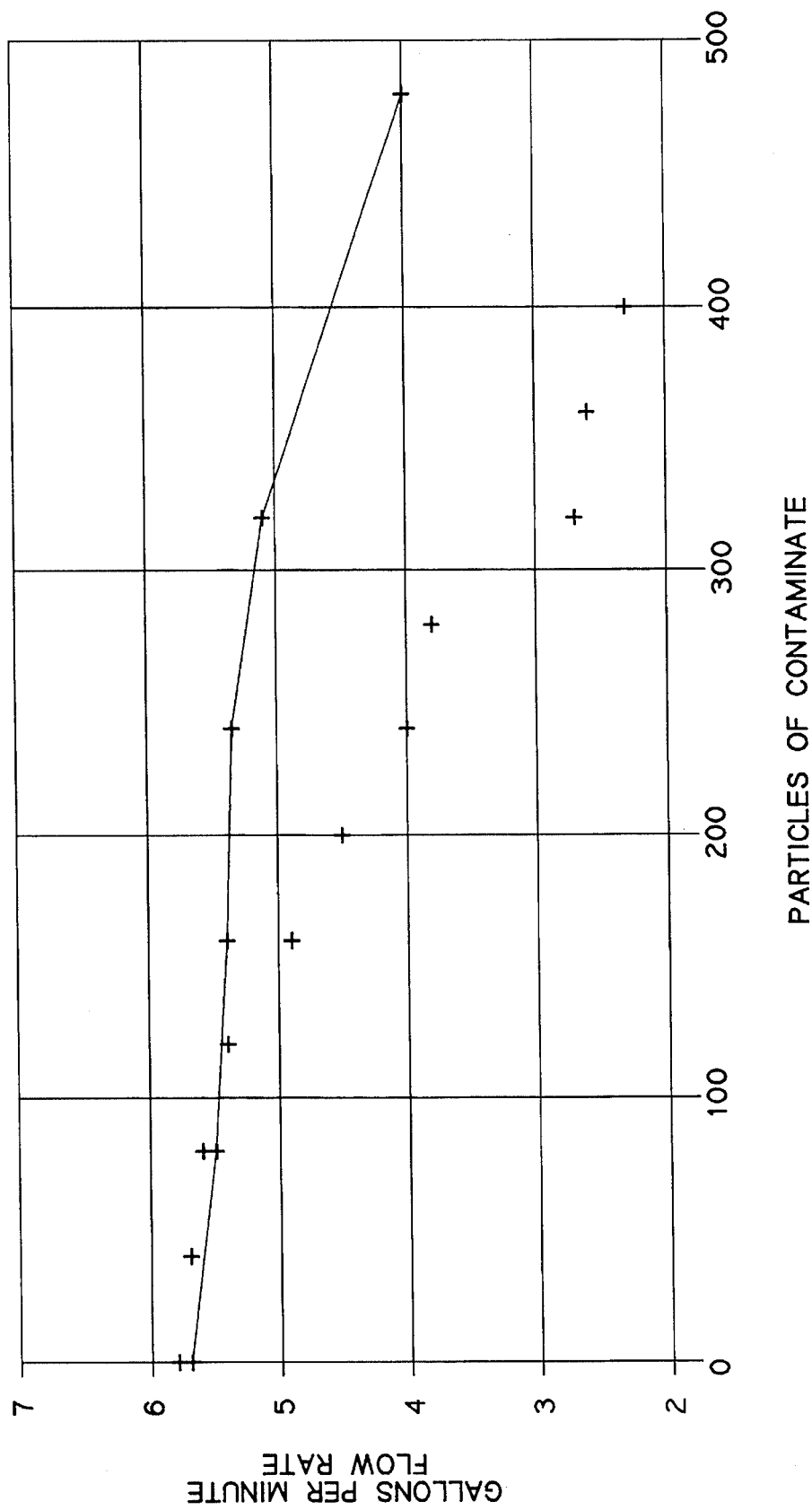
FIG. 9 shows a graph of inlet valve flow rate.

FIG. 9 shows a water valve screen performance comparison graph when using the prior art water valve with a standard metal mesh screen 22P (shown in FIG. 1) against the clog resistant water valve inlet screen 22 (shown in FIG. 2). This test measured flow rate against particles of contaminates introduced to the inlet screen. The particles of contaminates used were large particles with a surface area greater than 0.0004 square inches (0.0026 square centimeters) such that no particles would pass through the screen passages 57. The particles were shaped as flakes and chunks, intending to simulate pipe scale and lime scale which are likely particles that the inlet screen might be filtering. Forty particles at a time were introduced directly into the water source pipe of each valve, the water was turned on with a pressure 30 psi, and a measurement of water flow was taken with a Fisher Porter Flowrator Meter at a point just before the inlet of each water valve. Following each measurement, forty more contaminate particles were introduced into each valve's water source pipe. This measurement process was repeated until the valve with the standard metal mesh screen failed (a 2.5 gallon per minute flow rate was viewed as failure).

The resulting graph from the test is shown in FIG. 9 and reveals that when the screens begin to accumulate a large number of contaminate particles, the clog resistant water valve inlet screen 22 allows much more water to pass through the screen than the standard metal mesh screen 22P. The clog resistant water valve inlet screen's greater flow rate can be attributed to its design features.

What is claimed is:

1. A clog resistant water valve, comprising:
   (a) an inlet channel for receiving water from a water source pipe and a valving cavity for controlling water flow into an appliance; and,
   (b) an inlet screen carried in the water valve inlet channel having an upstream end, a downstream end and a sidewall, the inlet screen comprising:
   (1) a mesh network, having openings formed on the upstream end and its sidewall, for screening contaminates received through the water source pipe from entering the water valve, and,
   (2) ribs of differing height formed on the mesh network that extend outwardly from the mesh network.

2. The clog resistant water valve as in claim 1 wherein the ribs include sidewall ribs that are oriented substantially perpendicular to the direction of water flow along the sidewall.

3. The clog resistant water valve as in claim 1 wherein the ribs include sidewall ribs that are oriented substantially parallel to the direction of water flow along the sidewalls.

4. The clog resistant water valve as in claim 1 wherein the ribs are of alternating height.

5. The clog resistant water valve as in claim 1 wherein the ribs are radiused to reduce the stability of contaminates that come in contact with the ribs.

6. The clog resistant water valve as in claim 1 wherein the ribs include face ribs on the inlet screen upstream end.

7. The clog resistant water valve as in claim 1, wherein the inlet screen is a glass filled polypropylene material.

8. The clog resistant water valve as in claim 1 wherein the mesh network openings each define an area of about 0.0004 square inches (0.0026 square centimeters).

9. The clog resistant water valve as in claim 1 wherein the inlet screen tapers from the downstream end to the upstream end, the downstream end having a larger diameter than the upstream end.

10. The clog resistant water valve as in claim 1 wherein installation tabs extend from the inlet screen sidewall to stabilize the inlet screen in the inlet channel.

11. The clog resistant water valve in claim 10 wherein the installation tabs are slightly tapered from the upstream end to the downstream end, opposing edges of the installation tabs further apart on the upstream portion of the inlet screen than on the downstream portion of the inlet screen for ease of installation and to secure the inlet screen in the inlet channel.

12. The clog resistant water valve as in claim 1 wherein at least one face rib extends from the inlet screen upstream end, to form a removal tab to facilitate removal of the inlet screen from the inlet channel.

13. The clog resistant water valve as in claim 12 wherein the removal tab shows indicia of removal when the removal tab is grasped by a mechanical device that applies pressure to the removal tab when removing the inlet screen from the inlet channel.

14. A clog resistant water valve, comprising:
   (a) a water valve having an inlet channel for receiving water from a water source pipe and a valving cavity for controlling water flow into an appliance; and,
   (b) an inlet screen having an .upstream end, a downstream end and a sidewall carried in the water valve inlet channel, the inlet screen comprising:
   (1) a mesh network having openings formed on the upstream end and its sidewall for screening contaminates received through the water source pipe from entering the water valve, and,
   (2) a serrated flange extending from the downstream end of the inlet screen having flange passages around its edge defining serrations permitting communication of water from the inlet channel into the valving cavity, thus creating a low pressure area around the serrated flange causing more water to flow towards the flange and urging contaminates on the mesh network towards the serrated flange.

15. The clog resistant water valve as in claim 14 wherein the serrated flange is distanced from the inlet channel base by extending installation tabs past the downstream end of the flange to permit water flow through the serrated flange passages, around the inlet channel downstream end and into the valving cavity.

16. The clog resistant water valve as in claim 14 wherein the inlet screen is a glass filled polypropylene material.

17. The clog resistant water valve as in claim 14 wherein the mesh network openings each define an area of about 0.0004 square inches (0.0026 square centimeters).

18. The clog resistant water valve as in claim 14 wherein the inlet screen tapers from the downstream end to the upstream end, the downstream end having a larger diameter than the upstream end.

19. The clog resistant water valve as in claim 14 wherein installation tabs extend from the inlet screen sidewall to stabilize the inlet screen in the inlet channel.

20. The clog resistant water valve in claim 19 wherein the installation tabs are slightly tapered from the upstream end to the downstream end, opposing edges of the installation tabs further apart on the upstream portion of the inlet screen than on the downstream portion of the inlet screen for ease of installation and to secure the inlet screen in the inlet channel.

21. The clog resistant water valve as in claim 14 wherein at least one face rib extends from the inlet screen upstream end, forming a removal tab to facilitate removal of the inlet screen from the inlet channel.

22. The clog resistant water valve as in claim 21 wherein the removal tab shows indicia of removal when the upstream tab is grasped by a mechanical device that applies pressure to the upstream tab remove the inlet screen from the inlet channel.

23. The clog resistant water valve as in claim 14 wherein the mesh network openings each define an area of about 0.0004 square inches (0.0026 square centimeters).

24. The clog resistant water valve as in claim 14 wherein the flange passages each define an area of about 0.00035 square inches (0.0023 square centimeters).

25. A method of directing particles of contamination away from an inlet screen in a water valve, comprising:

(a) providing a mesh network, having openings formed on an inlet screen upstream end and a sidewall, for screening contaminates from entering a valving cavity;

(b) maintaining water flow around particles of contamination that become positioned on the mesh network by positioning contaminates away from the openings with ribs of differing height;

(c) creating a turbulent flow of fluid around the inlet screen the ribs of differing height so as to direct the particles of contamination toward a downstream end of the inlet screen; and, (d) collecting contaminates around the downstream end of the inlet screen by creating a low pressure area around the downstream end of the inlet screen with a serrated flange to urge particles of contamination away from the mesh network toward the serrated flange.

* * * * *

UNITED STATES PATENT AND TRADEMARK OFFICE
Certificate

Patent No. 5,545,318                                                                             Patented: August 13, 1996

On petition requesting issuance of a certificate for correction of inventorship pursuant to 37 CFR 1.324, it has been found that the above-identified patent, through error and without any deceptive intent, improperly sets forth the inventorship.

Accordingly, it is hereby certified that the correct inventorship of this patent is: James William Richmond and Neil Edward Grah.

Signed and Sealed this Seventeenth Day of June, 1997.

ROBERT A. DAWSON
*Supervisory Patent Examiner*
Art Unit 1306